United States Patent
Fardig et al.

(10) Patent No.: US 11,343,291 B2
(45) Date of Patent: May 24, 2022

(54) ONLINE CONFERENCE USER BEHAVIOR

(71) Applicant: Lenovo (Singapore) Pte. Ltd., Singapore (SG)

(72) Inventors: Matthew Fardig, Boonville, IN (US); Richard German, Greencastle, IN (US); Anthony Mourey, Fort Wayne, IN (US); Shawn Sharp, Buhl, ID (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 16/366,718

(22) Filed: Mar. 27, 2019

(65) Prior Publication Data

US 2020/0314158 A1 Oct. 1, 2020

(51) Int. Cl.
| | |
|---|---|
| H04L 65/1096 | (2022.01) |
| G10L 25/51 | (2013.01) |
| H04N 7/15 | (2006.01) |
| H04L 65/1083 | (2022.01) |

(52) U.S. Cl.
CPC .......... *H04L 65/1096* (2013.01); *G10L 25/51* (2013.01); *H04L 65/1083* (2013.01); *H04N 7/152* (2013.01)

(58) Field of Classification Search
CPC ............. H04L 65/1096; H04L 65/1083; H04L 65/403; H04N 7/152; H04N 7/15; G10L 25/51; G06Q 10/10; G06Q 10/06; G06Q 30/08; G06Q 50/01; G06Q 50/205; G06Q 10/06311; G06Q 10/109; G06Q 2230/00; G09B 7/00; G09B 5/00; G09B 7/02; G09B 5/065; G09B 5/06; H04M 3/566; H04M 3/563; H04M 2201/41; H04M 3/42221; H04M 3/42365; H04M 3/42229; H04M 11/10

See application file for complete search history.

(56) References Cited

U.S. PATENT DOCUMENTS

| | | | | |
|---|---|---|---|---|
| 8,743,743 | B1 * | 6/2014 | Mai ....................... | H04M 3/566 370/260 |
| 9,191,218 | B1 * | 11/2015 | Rehder ............... | H04L 12/1822 |
| 2007/0174387 | A1 * | 7/2007 | Jania ..................... | G06Q 10/10 709/204 |
| 2011/0292162 | A1 * | 12/2011 | Byun .................... | H04N 7/147 348/14.08 |
| 2013/0226576 | A1 * | 8/2013 | Jaiswal ................. | G10L 13/033 704/235 |
| 2014/0337034 | A1 * | 11/2014 | John ...................... | G10L 25/48 704/270 |
| 2016/0073056 | A1 * | 3/2016 | Katzman ............... | H04L 65/403 348/14.07 |
| 2017/0154637 | A1 * | 6/2017 | Chu ...................... | G09B 21/006 |
| 2018/0351756 | A1 * | 12/2018 | Dave ................. | H04N 21/23418 |
| 2019/0180739 | A1 * | 6/2019 | Raja ......................... | G10L 15/30 |
| 2020/0110572 | A1 * | 4/2020 | Lenke ..................... | H04N 7/15 |

* cited by examiner

*Primary Examiner* — Caroline H Jahnige
(74) *Attorney, Agent, or Firm* — Ference & Associates LLC

(57) ABSTRACT

One embodiment provides a method, including: identifying, using a processor, a behavior of a user in a conferencing application; classifying, based on the identified behavior, the user as an aggressive contributor or an acquiescent contributor; and performing, based on the classification, a function. Other aspects are described and claimed.

9 Claims, 3 Drawing Sheets

ONLINE CONFERENCE USER BEHAVIOR

BACKGROUND

Web conference groups are frequently formed to facilitate real-time discussion between two or more individuals. These online conferences are popular in the professional world and may operate similar to in-person conference meetings in that they allow topics to be discussed between multiple people simultaneously. Additionally, online conferencing provides the added benefit of connecting individuals across geographically dispersed locations. Common applications for online conferencing include meetings, training events, lectures, presentations, and the like.

BRIEF SUMMARY

In summary, one aspect provides a method, comprising: identifying, using a processor, a behavior of a user in a conferencing application; classifying, based on the identified behavior, the user as an aggressive contributor or an acquiescent contributor; and performing, based on the classification, a function.

Another aspect provides an information handling device, comprising: a processor; a memory device that stores instructions executable by the processor to: identify a behavior of a user in a conferencing application; classify, based on the identified behavior, the user as an aggressive contributor or an acquiescent contributor; and perform, based on the classification, a function.

A further aspect provides a product, comprising: a storage device that stores code, the code being executable by a processor and comprising: code that identifies a behavior of a user in a conferencing application; code that classifies, based on the identified behavior, the user as an aggressive contributor or an acquiescent contributor; and code that performs, based on the classification, a function.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
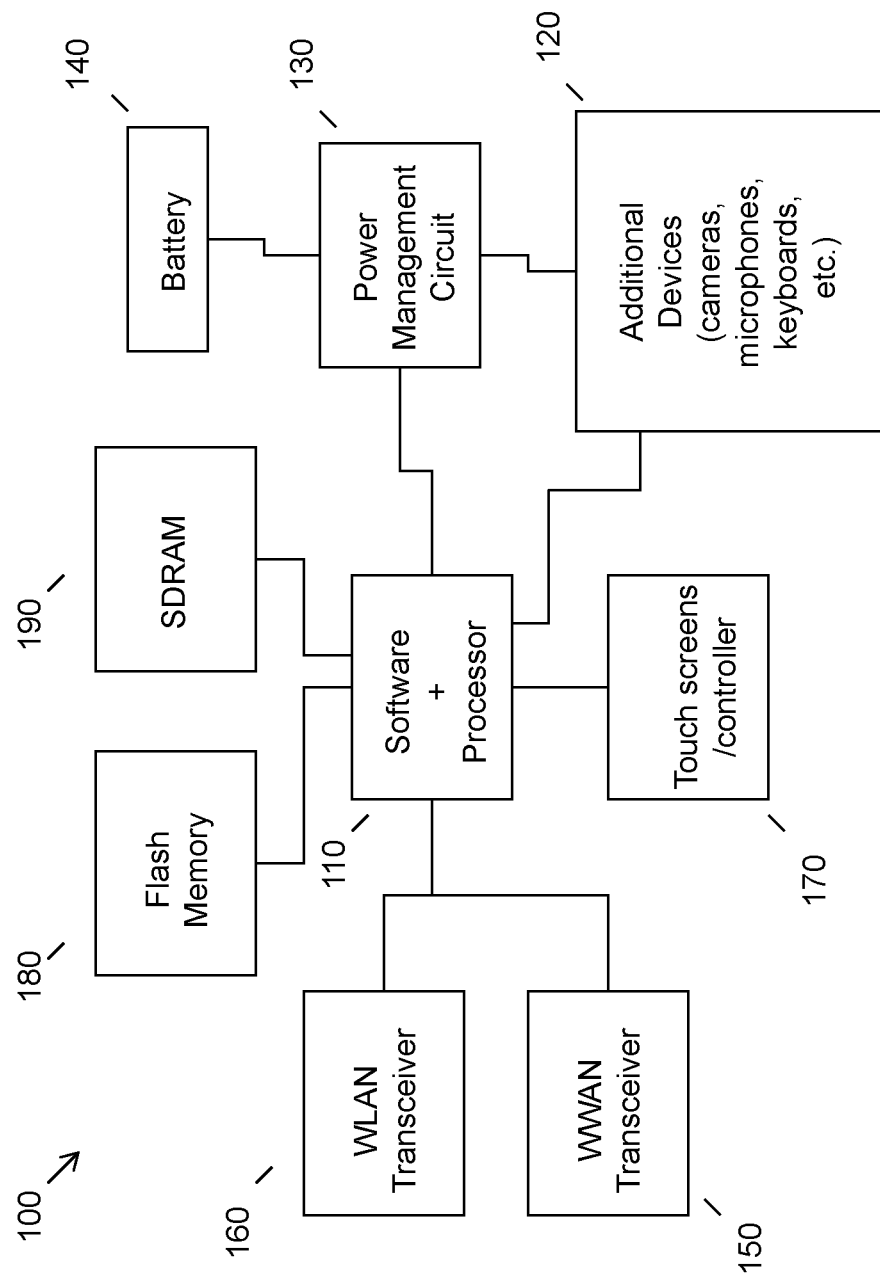
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Unlike conventional conferences where attendees have face-to-face interactions with each other, attendees in online conferences generally communicate through one or more devices. For example, a plurality of attendees using web-connected devices (e.g., laptops and/or personal computers, smartphones, tablets, etc.) may connect to an online conference room (e.g., hosted on a conferencing application, a website, etc.) where communication between the attendees may be facilitated via inputs (text inputs, voice inputs, video inputs, etc.) to the attendee's devices.

The absence of in-person communication may lead certain attendees of online conferences to behave in ways that they otherwise would not. For example, occasions often arise where an attendee may talk over or interrupt another attendee, ignore an on-going conversation or presentation, provide input too frequently, intimidate another attendee away from providing input, and the like. Other factors such as poor network conditions and ambient noise picked up by certain connected devices may also work to degrade the conference experience. As a result of the foregoing, attendees in online conferences often have difficultly effectively communicating and sharing their ideas.

Existing online conferencing tools are unable to directly and automatically address the aforementioned issues. More particularly, conventional tools may allow a moderator to mute the entire room, or a specific individual in the room, but may make it impossible to manage when an attendee is being prohibited from sharing their ideas. Some solutions may provide a "raise hand" feature for attendees who want to proclaim their intent to speak, however, this solution still requires some element of manual intervention by a user.

Accordingly, an embodiment may identify a behavior of a user in an online conference and thereafter automatically perform an action based on that behavior. In an embodiment, a behavior of a user in a conferencing application may be identified. For example, an embodiment may identify whether a user provides inputs too frequently, often interrupts other users, is prevented from providing input based upon the actions of other users, etc. An embodiment may then classify the user as an aggressive contributor or a passive/acquiescent contributor based on their behavior. Thereafter, an embodiment may perform a function based on the classification. As an example, for an interrupting user an embodiment may provide a notification to the user to stop interrupting or may mute the user for a predetermined period of time. In another example, for an acquiescent contributor, an embodiment may provide a notification to the user urging them to share their ideas or may provide an alternative input means for the user to share their ideas without being interrupted. Such a method may curb conversation-dominating behavior by more zealous attendees while simultaneously allowing other, less aggressive attendees to participate in the conversation.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, external keyboard, other input devices, etc. System 100 often includes one or more touch screens 170 for data input and display/rendering. System 100 also typically includes various memory devices, for example flash memory 180 and SDRAM 190.

Figure 2:
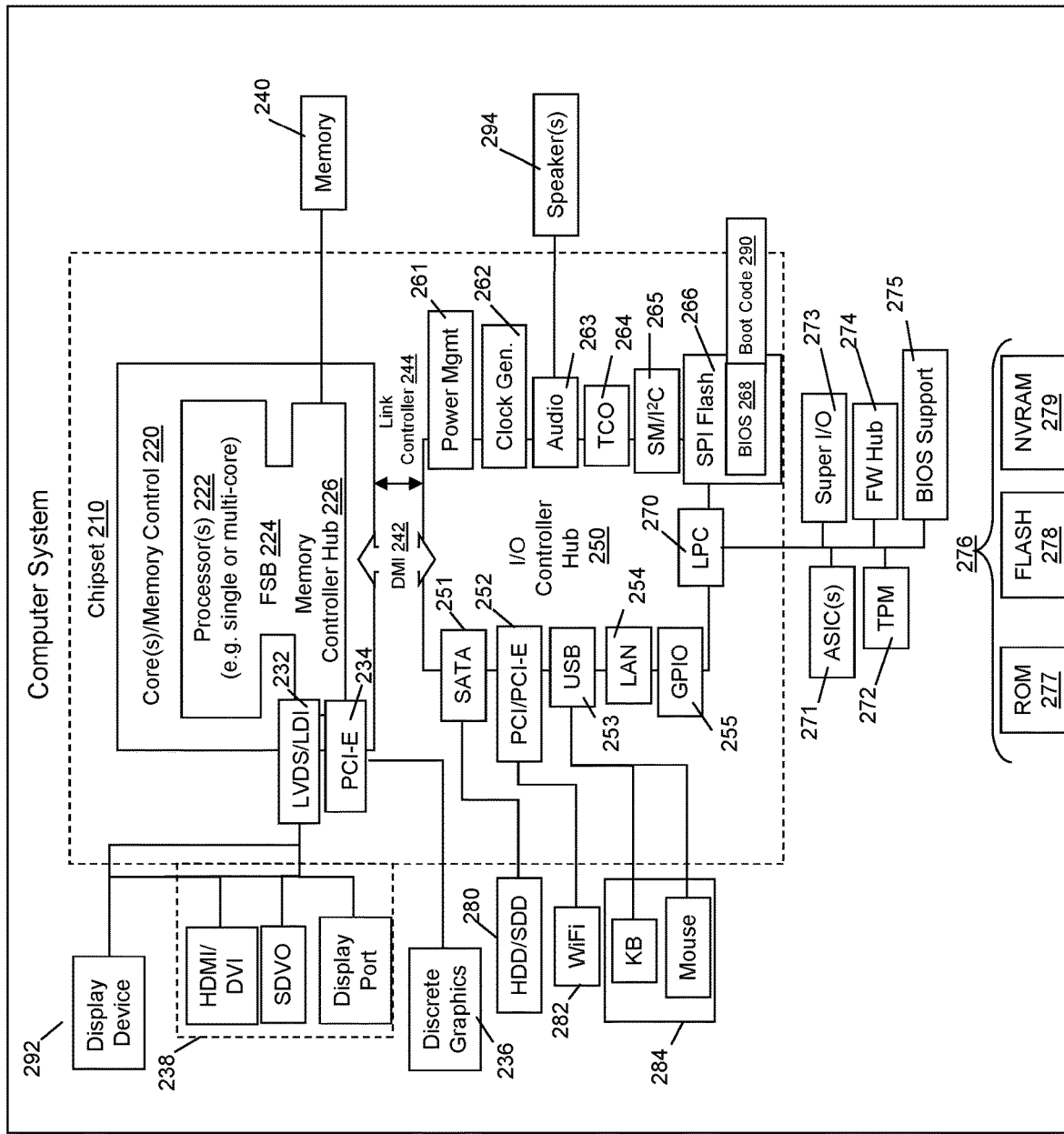
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as smart phones, tablets, laptops, personal computer devices generally, and/or other electronic devices that may be capable of engaging in online conference applications. For example, the circuitry outlined in FIG. 1 may be implemented in a tablet or smart phone embodiment, whereas the circuitry outlined in FIG. 2 may be implemented in a laptop.

Figure 3:
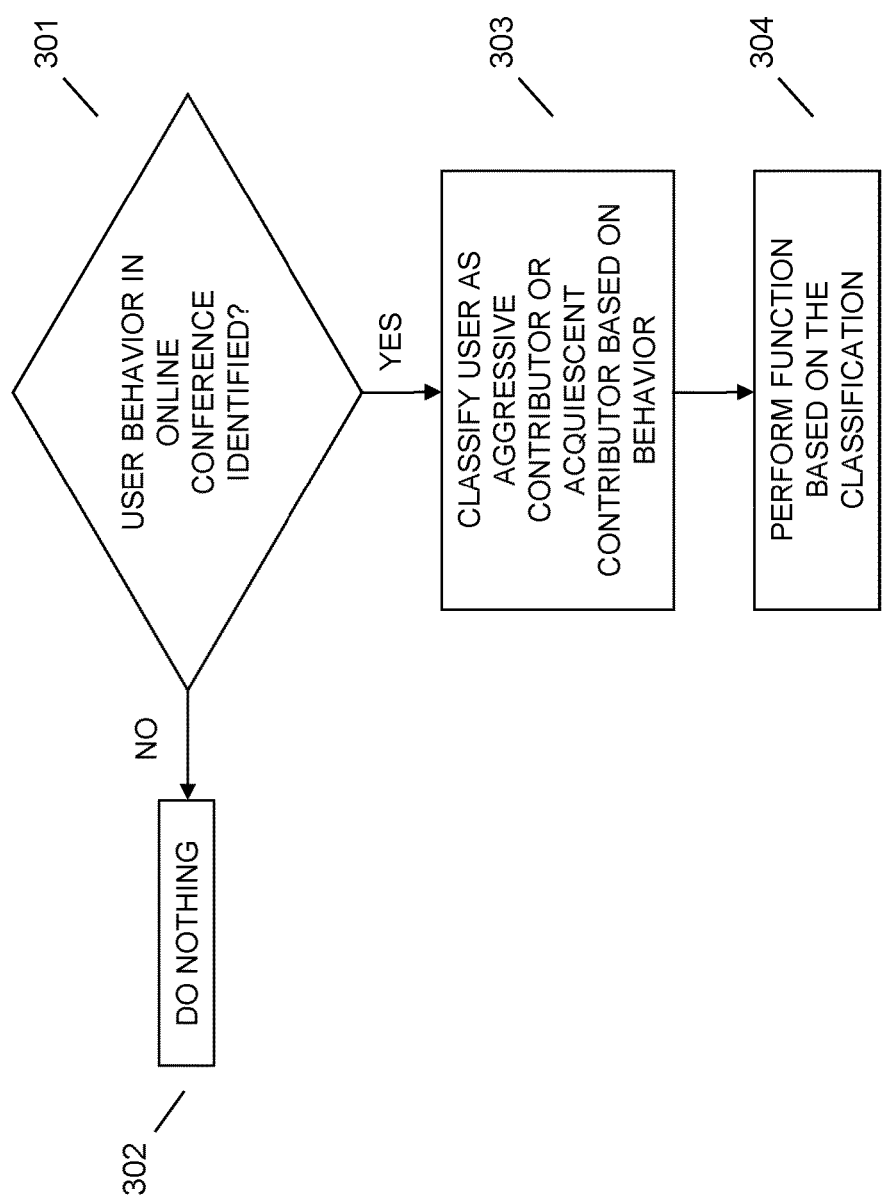
FIG. 3 illustrates an example method of identifying user behavior in an online meeting and performing a function based on a classification of the behavior.

Referring now to FIG. 3, an embodiment may identify a behavior of an attendee in an online conference and thereafter perform a function based on that behavior. At 301, an embodiment may identify a behavior of a user in an online conferencing application. In the context of this application, a behavior of a user may refer to one or more interactions the user may have with the conferencing application. For example, the behavior may refer to how often a user provides inputs to the application (e.g., the frequency of input provision within a predetermined period, etc.) or after a particular individual ceases speaking (e.g., a presenter, session leader, etc.). As another example, the behavior may refer to the way in which the inputs are provided (e.g., does a user talk over or interrupt another user while providing inputs, etc.). In yet another example, the behavior may refer to an identification of a user's failed attempts to provide inputs to the conference group (e.g., unmuting and then muting their input channel, etc.). In an embodiment, the behavior may be identified automatically, without particular user designation, using one or more of the following behavior identification methods. For simplicity purposes, the remainder of the application will be discussed with reference to user voice inputs to a conferencing application. However, such a designation is not limiting and a user may interact with the conferencing application via other input means (e.g., touch inputs, text inputs, video inputs, etc.).

In an embodiment, the identification of frequent input behavior may be identified by determining how many user inputs have been provided to the application within a threshold period. In an embodiment, the threshold period may refer either a threshold time period or a threshold session number. More particularly, with reference to a threshold time period, an embodiment may determine whether a user has exceeded a threshold number of inputs (e.g., 2 inputs, 5 inputs, 10 inputs, etc.) within a predetermined period of time (e.g., 1 minute, 5 minutes, 10 minutes, etc.). Alternatively, with respect to a threshold session number, an embodiment may determine whether a user has exceeded a threshold number of inputs in a single session (e.g., in the span of a conference session, in the span of a presenter's segment, etc.). In an embodiment, the threshold number of inputs and threshold period may originally be set by an application programmer and thereafter adjusted by a user.

An embodiment may also identify the frequency with which a user provides input after a predetermined attendee finished providing input. For example, an embodiment may identify users that frequently provide input after a moderator, session leader, or presenter finish providing input. These identifications may indicate that the user is dominating a conversation and preventing other attendees from participating (e.g., by always being the first to answer a question, by always being the first to share an opinion, etc.). In an embodiment, the identification of frequent input behavior in the foregoing situation may be facilitated by identifying how many times the user was the first to provide input after the predetermined attendee finished providing input. If the number of times the user was the first input provider exceeds a threshold number (e.g., 3, 5, 10, etc.) for a particular session or a time period, an embodiment may conclude the user is engaging in frequent input behavior.

In an embodiment, the identification of interrupting behavior may be facilitated by detecting that an input channel belonging to another attendee is in use at the time of input by the user. For example, responsive to identifying that an audio input channel associated with Attendee A is active when User B begins to provide input, an embodiment may determine that User B is interrupting Attendee A. In an embodiment, interrupting behavior may also be associated with situations where a user forces another attendee to stop providing input. For example, responsive to identifying that Attendee A and User B begin to provide input substantially simultaneously but Attendee A ceases to provide input while User B continues to provide input, an embodiment may conclude that User B interrupted Attendee A.

In an embodiment, reluctant input behavior may be identified through various means. For instance, an embodiment may identify that a user is engaging in reluctant input behavior when a user firsts unmutes their audio input channel and thereafter mutes it again within a predetermined time period (e.g., 5 seconds, 10 seconds, etc.). Such a situation may provide an indication that a user had a conversation point but decided not to share it. As another example, an embodiment may identify that a user is engaging in reluctant input behavior responsive to identifying that a user has not interacted with their device (e.g., by providing inputs of any kind to the device, etc.) for a predetermined period of time (e.g., 5 minutes, 10 minutes, etc.).

Responsive to not identifying, at 301, a user's behavior in a conferencing application, an embodiment may, at 302, take no additional action. Alternatively, responsive to identifying, at 301, a user's behavior in a conferencing application, an embodiment may, at 303, classify the user as an aggressive input contributor or a passive, acquiescent input contributor based on their behavior.

An embodiment may classify a user as an aggressive contributor if an embodiment determines that a user exhibits frequent input provider or interrupting input behavior. Alternatively, an embodiment may classify a user as an acquiescent contributor if an embodiment determines that a user exhibits reluctant input behavior. In an embodiment, either of the foregoing classifications may be assigned after the corresponding input behaviors have been identified a predetermined amount of times (e.g., once, twice, three times, etc.). In an embodiment, a user's classification may be reset for each new online conference. Alternatively, in another embodiment, a user may carry their classification across online conferences.

At 304, an embodiment may perform a function dependent on the classification derived at 303. In an embodiment, the function may be a notification that may be provided to one or more users of either of the classifications. For example, responsive to identifying that an aggressive user is exhibiting frequent talking behavior and/or interrupting behavior, an embodiment may automatically provide a notification to the user or conference moderator that such an action is occurring. As another example, responsive to identifying that an acquiescent user is choosing not to provide input, an embodiment may automatically provide a notification to the user encouraging them to do so. Alternatively, an embodiment may provide a notification to a conference moderator informing them that a user is not participating for one or more reasons. In an embodiment, in situations where a user's classification survives across conferences, a notification may automatically be provided to one or more users at the outset of the conference. For example, an embodiment may automatically provide a moderator with a stored list that identifies all the known aggressive contributors and acquiescent contributors enrolled in the conference. The sorted list may suggest a "calling order" in which the acquiescent contributors are prioritized over aggressive contributors. Alternatively, as another example, an embodiment may automatically provide a warning to the users classified as aggressive contributors to potentially curb their behavior before the conference starts.

In an embodiment, with respect to users classified as aggressive contributors, an embodiment may perform a mute function on one or more users. For example, responsive to identifying that a user is exhibiting interrupting behavior, an embodiment may automatically mute the user, thereby preventing them from providing inputs for a predetermined period of time (e.g., 1 minute, 5 minutes, for the remainder of the conference, etc.). In an embodiment, the user may be muted after a predetermined number of occurrences of the behavior (e.g., after 2 instances of interrupting or talking over, 3 instances, etc.).

In an embodiment, with respect to users classified as acquiescent contributors, an embodiment may provide the user with an alternative input method. For example, responsive to identifying that a user attempting to provide voice input is continuously being interrupted or talked over, an embodiment may automatically provide that user with an option to provide text input (e.g., in a popup window, etc.). In an embodiment, the input provided by the acquiescent user utilizing the alternative input means may be visually distinguished to the other attendees in the conference. For example, an acquiescent user's text inputs may be highlighted to distinguish them from text inputs provided by others. In an embodiment, in situations where a user's classification survives across conferences, the acquiescent contributor may automatically be provided with an alternative input method at the beginning of the conference.

The various embodiments described herein thus represent a technical improvement to conventional online conference moderation techniques. Using the techniques described herein, an embodiment may first identify a behavior of a user in an online conference and then classify the user as an aggressive contributor or an acquiescent contributor based on the behavior. Thereafter, an embodiment may automatically perform a function based on the classification. For example an embodiment may dynamically provide warning notifications and/or mute aggressive contributors. Alternatively, an embodiment may encourage and/or provide an alternative input means for acquiescent contributors. Such a method may allow for effective communications to be conducted between attendees in an online web conference.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:

identifying, using a processor, a behavior of a user of a plurality of users in a session of a conferencing application;

classifying, based on the identified behavior, the user as an acquiescent contributor, wherein the classifying the user as an acquiescent contributor comprises identifying, in the behavior, at least one failed attempt of the user to provide audible input using a first input method to the conferencing application within a threshold period;

performing, based on the classification, a function, wherein the performing the function comprises providing, in addition to the first input method, the user with an alternative input method;

storing, in a database, an indication that the user is classified as the acquiescent contributor, wherein the storing comprises storing the classification for the user and a determined classification for each of the other users of the plurality of users, wherein the stored classification is accessible in a subsequent session; and providing, at an outset of the subsequent session, the alternative input method to the user in addition to the first input method, wherein the providing comprises automatically providing the alternative input method at a beginning of a new conference to each user classified as an acquiescent contributor.

2. The method of claim 1, wherein the performing the function comprises providing a notification to at least one of the user and another user about the behavior.

3. The method of claim 1, wherein the performing the function comprises providing, to a moderating user of the conferencing application, a sorted list of the plurality of users, wherein the sorted list prioritizes the acquiescent contributors over the aggressive contributors.

4. The method of claim 1, wherein the performing the function further comprises visually distinguishing, to at least a conference moderator, transcripts of inputs provided by the acquiescent contributor in an input stream.

5. An information handling device, comprising:
a processor;
a memory device that stores instructions executable by the processor to:
identify a behavior of a user in a conferencing application, wherein the conferencing application comprises a plurality of users;
classify, based on the identified behavior, the user as an acquiescent contributor, wherein the classifying the user as an acquiescent contributor comprises identifying, in the behavior, at least one failed attempt of the user to provide audible input using a first input method to the conferencing application within a threshold period;
perform, based on the classification, a function, wherein the instructions executable by the processor to perform the function comprise instructions executable by the processor to: provide, in addition to the first input method, the user with an alternative input method;
store, in a data base, an indication that the user is classified as the acquiescent contributor, wherein to store comprises storing the classification for the user and a determined classification for each of the other users of the plurality of users, wherein the stored classification is accessible in a subsequent session; and
provide, at an outset of the subsequent session, the alternative input method to the user in addition to the first input method, wherein to provide comprises automatically providing the alternative input method at a beginning of a new conference to each user classified as an acquiescent contributor.

6. The information handling device of claim 5, wherein the instructions executable by the processor to perform the function comprise instructions executable by the processor to provide a notification to at least one of the user and another user about the behavior.

7. The information handling device of claim 5, wherein the instructions executable by the processor to perform the function comprise instructions executable by the processor to provide, to a moderating user of the conferencing application, a sorted list of the plurality of users, wherein the sorted list prioritizes acquiescent contributors over the aggressive contributors.

8. The information handling device of claim 5, wherein the instructions executable by the processor to perform the function comprise instructions executable by the processor to visually distinguish, to at least one conference moderator, transcripts of inputs provided by the acquiescent contributor in an input stream.

9. A product, comprising:
a storage device that stores code, the code being executable by a processor and comprising:
code that identifies a behavior of a user in a conferencing application, wherein the conferencing application comprises a plurality of users;
code that classifies, based on the identified behavior, the user as an acquiescent contributor, wherein the classifying the user as an acquiescent contributor comprises identifying, in the behavior, at least one failed attempt of the user to provide audible input using a first input method to the conferencing application within a threshold period;
code that performs, based on the classification, a function, wherein the code that performs the function comprises code that provides, in addition to the first input method, the user with an alternative input method;
code that stores, in a database, an indication that the user is classified as the acquiescent contributor, wherein the code that stores comprises storing the classification for the user and a determined classification for each of the other users of the plurality of users, wherein the stored classification is accessible in a subsequent session; and
code that provides, at an outset of the subsequent session, the alternative input method to the user in addition to the first input method, wherein the code that provides the alternative input method comprises automatically providing the alternative input method at a beginning of a new conference to each user classified as an acquiescent contributor.

* * * * *